(12) United States Patent
Zhang et al.

(10) Patent No.: US 9,887,953 B2
(45) Date of Patent: *Feb. 6, 2018

(54) SYSTEM AND METHOD FOR DISPLAYING MICRO-BLOG MESSAGE, MICRO-BLOG TERMINAL AND SERVER

(71) Applicant: TENCENT TECHNOLOGY (SHENZHEN) COMPANY LIMITED, Shenzhen, Guangdong (CN)

(72) Inventors: Li Zhang, Shenzhen (CN); Jingjing Li, Shenzhen (CN); Heng Wang, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 545 days.

This patent is subject to a terminal disclaimer.

(21) Appl. No.: 14/560,764

(22) Filed: Dec. 4, 2014

(65) Prior Publication Data

US 2015/0095809 A1    Apr. 2, 2015

Related U.S. Application Data

(63) Continuation-in-part of application No. 14/115,265, filed as application No. PCT/CN2012/073035 on Mar. 26, 2012, now Pat. No. 8,935,618.

(30) Foreign Application Priority Data

May 5, 2011    (CN) .......................... 2011 1 0114892

(51) Int. Cl.
*G06F 3/048* (2013.01)
*H04L 12/58* (2006.01)
(Continued)

(52) U.S. Cl.
CPC ............ *H04L 51/32* (2013.01); *G06F 3/0483* (2013.01); *G06F 17/3089* (2013.01); *H04L 51/22* (2013.01)

(58) Field of Classification Search
CPC ..................... G06F 2200/1637; G06F 3/04842
See application file for complete search history.

(56) References Cited

U.S. PATENT DOCUMENTS

2008/0040370 A1    4/2008    Bosworth et al.
2011/0055723 A1*   3/2011    Lightstone ............. G06Q 10/00
                                                            715/752

(Continued)

FOREIGN PATENT DOCUMENTS

CN    101072386 A    11/2007
CN    101090346 A    12/2007

(Continued)

OTHER PUBLICATIONS

State Intellectual Property Office of the P.R.C., "Office Action", dated Aug. 3, 2015. China.

(Continued)

*Primary Examiner* — William Bashore
*Assistant Examiner* — Rayeez Chowdhury
(74) *Attorney, Agent, or Firm* — Tim Tingkang Xia, Esq.; Locke Lord LLP

(57) ABSTRACT

The present disclosure relates to a system for displaying micro-blog messages, which includes: when the users look up the list roster, the micro-blog terminal sends an obtaining request to the micro-blog server, receives and display the list roster fed back by the micro-blog server; when any one of the micro-blog list is selected from the list roster, the micro-blog terminal writes a name of the chosen micro-blog list into a new displaying page, and sending a message list request to the micro-blog server; the micro-blog terminal (Continued)

receives the message list of the chosen micro-blog list that is fed back from the micro-blog server, and displaying the message list of the chosen micro-blog list on the new message displaying page. It is disclosed a micro-blog terminal, server thereof.

4 Claims, 9 Drawing Sheets

(51) Int. Cl.
*G06F 3/0483* (2013.01)
*G06F 17/30* (2006.01)

(56) References Cited

U.S. PATENT DOCUMENTS

| | | | | |
|---|---|---|---|---|
| 2011/0087604 | A1* | 4/2011 | Chung | G06Q 10/06 705/301 |
| 2011/0270959 | A1* | 11/2011 | Schlusser | G06F 9/4443 709/223 |
| 2011/0295964 | A1* | 12/2011 | Hodgins | H04L 12/58 709/206 |
| 2012/0011239 | A1* | 1/2012 | Svane | G06Q 10/10 709/223 |
| 2012/0072835 | A1* | 3/2012 | Gross | G06Q 30/0269 715/243 |
| 2012/0203855 | A1* | 8/2012 | Hodgins | H04L 12/58 709/206 |
| 2013/0170813 | A1* | 7/2013 | Woods | H04N 5/765 386/200 |

FOREIGN PATENT DOCUMENTS

| | | |
|---|---|---|
| CN | 101374148 A | 2/2009 |
| CN | 101517529 A | 8/2009 |
| CN | 101681346 A | 3/2010 |
| CN | 101980497 A | 2/2011 |
| JP | 2009506401 A | 2/2009 |
| WO | 2004114140 A1 | 12/2004 |
| WO | 2009111152 A2 | 9/2009 |

OTHER PUBLICATIONS

Japan Patent Office, "Office Action for JP2014513360", Japan, dated Oct. 21, 2014.
Korean Intellectual Property Office, "Office Action for KR20140006993", Korea, dated Sep. 1, 2014.
Japan Patent Office, "Cited Non-Patent Literature for JP2014513360", Japan, dated Oct. 21, 2014.
USPTO, "Office Action for U.S. Appl. No. 14/115,265", United States, dated Jun. 20, 2014.
USPTO, "Office Action for U.S. Appl. No. 14/115,265", United States, dated Apr. 24, 2014.

* cited by examiner

Fig. 2

SYSTEM AND METHOD FOR DISPLAYING MICRO-BLOG MESSAGE, MICRO-BLOG TERMINAL AND SERVER

CROSS-REFERENCE TO RELATED PATENT APPLICATIONS

This application is a continuation-in-part of U.S. application Ser. No. 14/115,265, filed Nov. 1, 2013, now allowed, which itself is a U.S. national phase application of PCT application No. PCT/CN2012/073035, filed Mar. 26, 2012, which itself claims priority to Chinese application No. 201110114892.4, filed May 5, 2011. The disclosures of the above identified applications are hereby incorporated herein in their entireties by reference.

FIELD OF THE INVENTION

The present disclosure relates generally to the field of micro-blog technology, and more particularly, to a system for displaying micro-blog message, micro-blog terminal and server.

BACKGROUND OF THE INVENTION

Micro-blog is a system with a similarity to weblog system that allows messages to be posted instantly. Micro-blog is featured with its integrity and openness, which allows users to post messages thereon through mobile phones, instant messaging (IM) software, or external API (Application Programming Interface), etc. Along with the expanding of the application of IM software, posting micro-blog messages through IM is becoming an increasingly favorable way for users. Accordingly, the application of the micro-blog blossomed greatly as a new product which could expand the message dissemination mechanism of the IM.

Micro-blog list is an important application for the micro-blog system. Micro-blog list is a platform that allows a limited scope of focusing, linking, and communication for micro-blog users that have the same favorite or tags. When a user sets up a micro-blog list or is added into a micro-blog list, he or she could initiate conversation with multiple users within the right micro-blog list. Users may selectively follow other users or micro-blog lists that they are interested in, for building up a wide scope of relationship chain, as well as for quickly see messages posted by the users followed or included in the followed micro-blog lists. The messages posted by the users that are followed or included in the followed micro-blog lists are ranked by the timeline, the ranked message list is the homepage message list (or homepage message timeline), which stands for the most significance in the micro-blog application. Due to the discretion of the relationship chain in micro-blog, as a user follows large amount of users, the homepage message list would become disordered that critical message from particular users would be missed. For instance, when a followed user is relatively active, the homepage message list would be occupied by this followed user while other followed users' messages would be missed. A problem and demand arise along with the development of the micro-blog technology in effectively organizing the homepage message list, thereby increasing the efficiency in the usage of the homepage.

SUMMARY OF THE INVENTION

The embodiment of the present disclosure is providing a system for displaying micro-blog message, a micro-blog terminal and server, which could effectively organize and display the micro-blog main page messages, whereby enabling users to check the concerning micro-blog messages in an efficient way, while improving the users' using efficiency of the micro-blog main page.

It is provided by the current disclosure a micro-blog terminal, wherein the micro-blog terminal includes:

a micro-blog list management module including one or more processors used to send a list roster obtaining request to a micro-blog server when a query operation is detected indicating the user is querying for the micro-blog list roster, thereby request for obtaining the user's micro-blog list roster; to receive and display the user's micro-blog list roster in a display as the micro-blog server feeds back, the micro-blog list roster comprises at least one micro-blog list; to write the name of the chosen micro-blog list into a new displaying page when any one of the micro-blog list is selected from the list roster; and to send a message list request to the micro-blog server for obtaining a message list of the chosen micro-blog list; and a micro-blog message management module including one or more processors used to receive the message list of the chosen micro-blog list that is fed back from the micro-blog server, and to display the message list of the chosen micro-blog list on the new message displaying page with the name of the chosen micro-blog list in the display;

wherein the micro-blog list management module is further used to timely send an unread lookup request to the micro-blog server for looking up the unread messages of each micro-blog list comprised in the list roster; to receive and iterate the ID lists with unread signs that are fed back from the micro-blog server; and to display in the user's list roster the corresponding unread sign.

Correspondingly, it is further provided by the present disclosure a micro-blog server, the micro-blog server has a database, wherein the micro-blog server includes:

a micro-blog user module coupled to the database, the micro-blog user module is used to store and manage general information of micro-blog users, the general information of each user comprises user ID, micro-blog list IDs of micro-blog lists that the user joins or creates; to look up the micro-blog list IDs of the micro-blog lists that the user joins or creates according to the user ID comprised in an obtaining request from a micro-blog terminal; and to generate a micro-blog list ID roster accordingly;

a micro-blog list module coupled to the database, the micro-blog list module is used to store and manage general information of the micro-blog lists, the general information of each micro-blog list comprises micro-blog list ID and its member ID list; and to obtain the general information of the micro-blog lists corresponding to each micro-blog list ID according to the user's micro-blog list ID roster, to feed back to the micro-blog terminal the user's micro-blog list ID roster and the general information of the micro-blog lists corresponding to each micro-blog list ID; and to look up the member ID lists of the chosen micro-blog list according to the chosen micro-blog list ID comprised in a message list request that is sent from the micro-blog terminal;

a micro-blog indexing module coupled to the database, the micro-blog indexing module is used to manage message indexing, and to manage a mapping relationship between message indexing ID and the user ID; and to obtain the members' message indexing ID list of the chosen micro-blog list according to the member ID list of the chosen micro-blog list; to iterate the members' message indexing ID list of the chosen micro-blog list; to rank all the message indexing ID in light of the timeline; to generate the message indexing ID list of the chosen micro-blog list; and to feed back the message indexing ID list of the chosen micro-blog list to the micro-blog terminal; and a micro-blog message module coupled to the database, the micro-blog message module is used to manage message bodies and a mapping relationship between the message indexing ID and the message body; to provide the micro-blog terminal with message bodies corresponding to the message indexing ID list of the current message list; to draw the message bodies corresponding to the message indexing IDs in the messaging indexing ID list of the chosen micro-blog list according to the message indexing ID list of the chosen micro-blog list contained in the message body obtaining request sent from the micro-blog terminal; and to feed back the message bodies corresponding to the message indexing IDs in the message indexing ID list to the micro-blog terminal.

It is still provided by the current disclosure a system for displaying micro-blog messages, wherein the system includes an above mentioned micro-blog terminal, and an above mentioned micro-blog server.

A method includes:

generating a first request in response to a first operation;

displaying a micro-blog list roster which is generated in response to the first request;

assigning a name for a new displaying page which is displayed in response to a second operation;

generating a second request in response to the second operation;

demonstrating a feedback for the second request in the new displaying page; wherein the feedback comprises message list of a micro-blog list which is chosen through the second request.

Preferably, generating a first request in response to a first operation includes: corresponding the first operation with a first identifier; wherein the micro-blog list roster is corresponded to the first identifier.

Preferably, generating a second request in response to the second operation includes: corresponding the second operation with second identifiers, wherein the feedback for the second request comprises message lists corresponding to the second identifiers.

Preferably, the feedback for the second request is obtained comprising:

obtaining message indexing ID list according to second identifiers;

iterating the message indexing ID list, ranking all the message indexing IDs in light of the timeline, to generate a messaging indexing ID list corresponding to the second identifiers;

packaging the message indexing ID list corresponding to the second identifiers to generate third request for obtaining the message body corresponding to the second identifiers; and drawing the message bodies corresponding to the second identifiers.

The current disclosure is beneficiary in the following.

1. The embodiment of the current disclosure provides the user a list roster on which when the user chooses any one of the micro-blog list in the list roster, a new message displaying page is used for displaying the message list of the chosen micro-blog list. This solution for displaying micro-blog messages picks up the user following micro-blog list from the main message displaying page and displays in a different page, which organizes the messages of the users' main message page to be multiple pages in a tab illustrating mode, which facilitate the users in effective and quick check of the messages, and improves greatly the using efficiency of the micro-blog main page.

2. The current embodiment timely looks up the micro-blog lists in the list roster for the existence of unread message, and reminds the user the unread messages. This could remind the user to check the new messages in the micro-blog list in time, which facilitates the examination of the micro-blog message and the application of the micro-blog.

BRIEF DESCRIPTION OF THE DRAWINGS

For clear description of the embodiment or the conventional art, it is hereby briefly introduced necessary drawings for the description of the embodiments or the conventional art. It is clear that, the drawings in the below description would only relate to some of the embodiments of the present disclosure, for those skilled in the art, other drawing would be obtained according to the described drawings without inputting creative work.

FIG. 2 is a first illustrative diagram of the visual effect of the micro-blog message;

DESCRIPTION OF THE PREFERRED EMBODIMENTS

Clear and complete description of the technical solution of the embodiments of the current disclosure shall be made hereinafter with reference to the drawings. It is clear that the described embodiments are only part of the current disclosure instead of limiting the embodiments. Any embodiment that those skilled in the art could make without inputting creative spirit based on the embodiment herein would be defined as within the scope of the current disclosure.

The terms used in this disclosure generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in the disclosure, including examples of any terms discussed herein, is illustrative only, and in no way limits the scope and meaning of the disclosure or of any exemplified term. Likewise, the disclosure is not limited to various embodiments given in the disclosure.

As used in the disclosure herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The term "module", as used in the disclosure, may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "server", as used in the disclosure, refers to a system that includes software and suitable computer hardware.

The term "database", as used in the disclosure, refers to a comprehensive collection of related data organized for convenient access, generally in a computing device.

Figure 1:
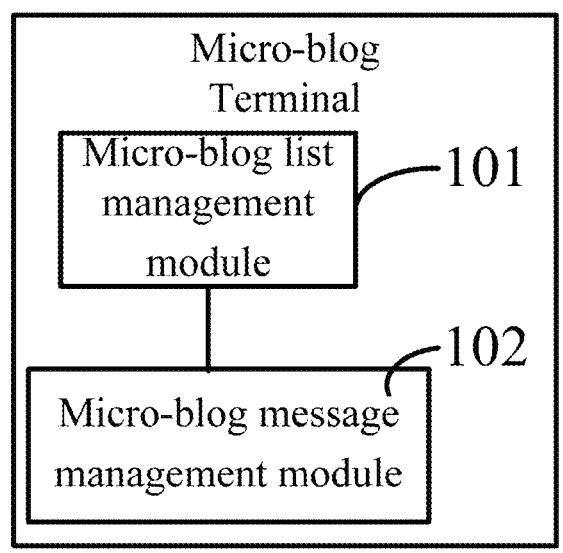
FIG. 1 is a structural diagram of the embodiment of the micro-blog terminal according to the current disclosure.

FIG. 1 is a structural diagram of the embodiment of the micro-blog terminal according to the current disclosure. The micro-blog terminal includes as follows.

A micro-blog list management module 101 is used for sending a list roster obtaining request to a micro-blog server when a query operation is detected indicating the user is querying for the micro-blog list roster, thereby requesting for obtaining the user's micro-blog list roster. The micro-blog list management module 101 is used for receiving and displaying the user's micro-blog list roster as the micro-blog server feeds back, which micro-blog list roster includes at least one micro-blog list. When the user chooses any one of the micro-blog list from the list roster, the name of the chosen micro-blog list is written into a new displaying page, and a message list request is sent to the micro-blog server for obtaining the message list of the chosen micro-blog list.

It could be appreciated that, the micro-blog list management module 101 may include one or more processors for sending the list roster obtaining request, for receiving and displaying the user's micro-blog list roster, for writing the name of the chosen micro-blog into the new displaying page, and for sending the message list request to the micro-blog server. Correspondingly, the micro-blog list management module 101 may include respective signal transceiver units for the receiving and sending.

The user is authenticated through using the registered user account and password to log in the micro-blog server through an IM client of the micro-blog terminal. After the successful authentication, a connection channel is set up between the micro-blog terminal and the micro-blog server, whereby the micro-blog terminal is coupled to the micro-blog server through a coupling server. The micro-blog terminal maintains the connection with the micro-blog server through sending a timing heartbeat to the micro-blog server. Each user has his own list roster according to the micro-blog list that he creates or joins.

Figure 2:
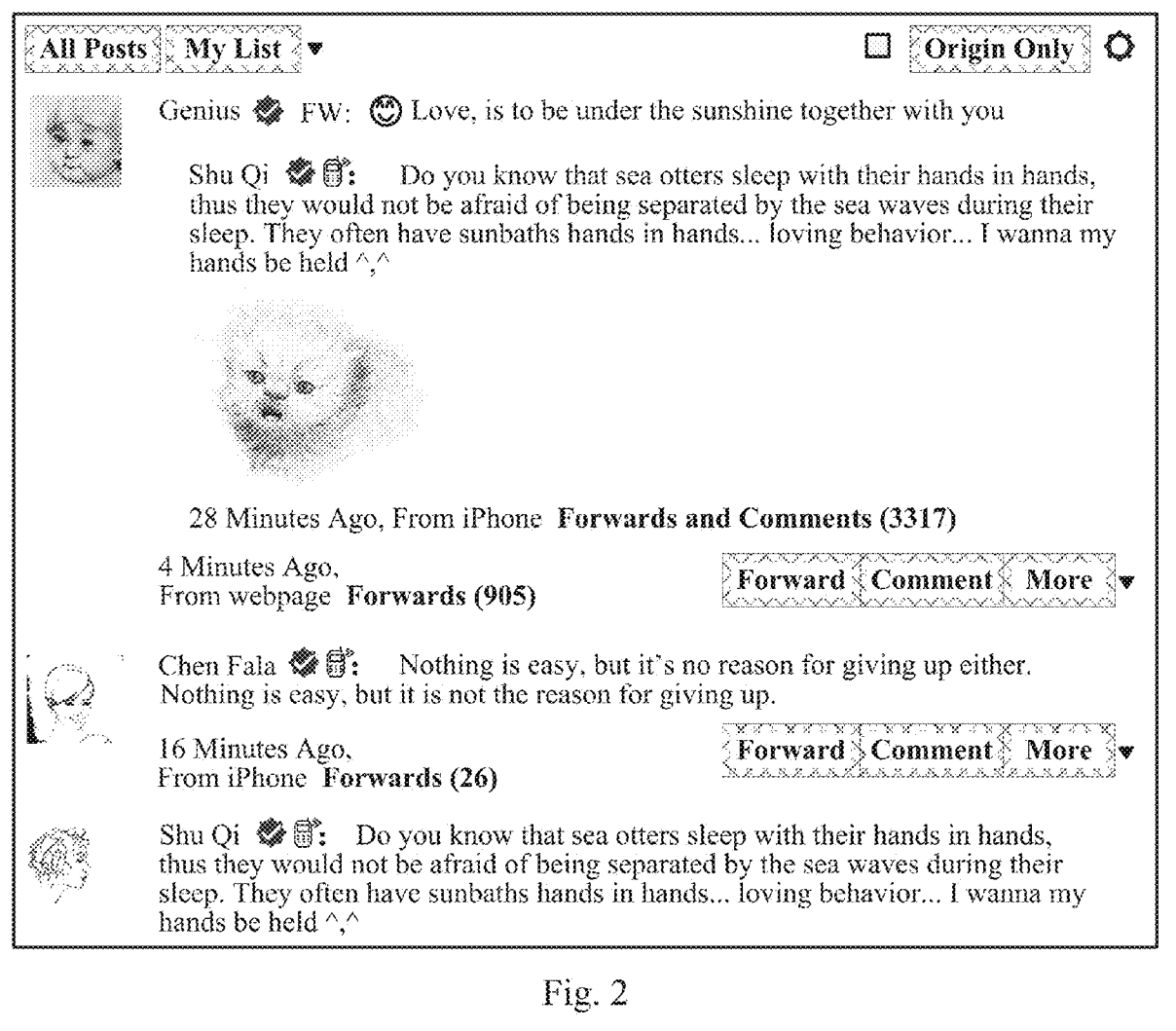
Figure 3:
FIG. 3 is a second illustrative diagram of the visual effect of the micro-blog message.

Referring also to FIG. 2, an illustrative diagram of the visual effect of the micro-blog message is provided. The micro-blog terminal provides the user a functional key named "My List". The functional key "My List" may be folded (as in FIG. 2). When the user clicks the functional key "My List" through a mouse, the micro-blog terminal would provide the user a pull-down menu, which includes the list roster where the user may be able to create a new list, or to manage (delete or edit) the lists that are included in the list roster. Referring also to FIG. 3, which is a second illustrative diagram of the visual effect of the micro-blog message, the micro-blog terminal provides the user a functional key named "My List". The functional key "My List" may be displayed in a floating mode (as in FIG. 3), wherein the functional key "My List" can be opened at the left region of the message display page. The user may, through clicking a mouse, to create a new list in the list roster displayed in "My list", or manage (delete or edit) the micro-blog list in the list roster.

The micro-blog list management module 101 generally manages the creation of the micro-blog list, the general information of the micro-blog list, and the message interface of the micro-blog lists. According to the current embodiment, the micro-blog terminal monitors the mouse operation of the user (e.g. the micro-blog terminal may include a monitor unit for receiving signals that the user triggers, and process the signals accordingly), when it is monitored that a user clicks the mouse for a lookup operation on the micro-blog list, the micro-blog list management module 101 sends an obtaining request to the micro-blog server for obtaining the list roster of the user. In detail, the micro-blog list management module 101 packages the user's ID, and accordingly generates the obtaining request to be sent to the micro-blog server, for obtaining the list roster of the user. After sending the obtaining request, the micro-blog list management module 101 receives and displays the list roster of the user that is fed back by the micro-blog server. The list roster includes at least one micro-blog list. It shall be understandable that, the micro-blog list management module 101 displays the list roster through a foldable mode or a floating mode.

It can be appreciated that the micro-blog terminal includes a display device, as described hereafter, for displaying the list roster. The micro-blog terminal would in this case include respectively driver devices or units, either integrated with the display device, or integrated with the micro-blog list management module 101, or be separately configured, for generating corresponding driver signals for driving the display device.

Figure 4:
FIG. 4 is a third illustrative diagram of the visual effect of the micro-blog message.

When the user choose any one of the micro-blog list in the list roster, with reference to FIG. 4 which is an illustrative diagram of a third visual effect of the micro-blog message, as the user chooses the micro-blog list named "Hong Kong and Taiwan Actress" from the list roster, the micro-blog list management module 101 would write the name of the micro-blog list "Hong Kong and Taiwan Actress" into a new message displaying page (as in FIG. 4), which new message displaying page is located in a latter page of the main message displaying page. The micro-blog list management module 101 packages the IDs of the "Hong Kong and Taiwan Actress" in the micro-blog list, to generate the obtaining request to be sent to the micro-blog server, to request for obtaining the message lists of the "Hong Kong and Taiwan Actress" in the chosen micro-blog list.

A micro-blog message management module 102 is used for receiving the message list of the chosen micro-blog list that is fed back from the micro-blog server, and for displaying in the new message displaying page with the name of the chosen micro-blog list the message list of the chosen micro-blog list.

The micro-blog message management module 102 manages the micro-blog messages of the user. In the current embodiment, after the micro-blog list management module 101 sends a message list request, the micro-blog message management module 102 receives the message list of the chosen micro-blog list that is fed back from the micro-blog server, and displays in the new message displaying page with the name of the chosen micro-blog list the message list of the chosen micro-blog list. In detail, the micro-blog message management module 102 receives a message indexing ID list and message bodies corresponding to each message indexing ID in the message indexing ID list that are fed back from the micro-blog server, and creates an Item control for each message of the chosen micro-blog list, to generate a message list; and sequentially display the message list of the chosen micro-blog list in the new message displaying page with the name of the chosen micro-blog list (with reference to FIG. 4 for details). It shall be mentioned that, the current embodiment picks up the message lists that the user is following in the micro-blog list from the main message displaying page, and sequentially displays in different pages, which facilitate the users in effective and quick check of the messages, and improves greatly the using efficiency of the micro-blog main page. It shall be understood that, the micro-blog message management module 102 is also used for managing the posting, deleting operations of the user to the micro-blog messages, which is similar to the art and would not be described herein.

Similarly, it can be appreciated that the micro-blog message management module 102 includes one or more processors or corresponding signal transceiver units for receiving the message list of the chosen micro-blog list that is fed back from the micro-blog server, for displaying the message list of the chosen micro-blog list on the new message displaying page. The described driver devices or units of the micro-blog terminal may also be integrated with the micro-blog message management module 102 for driving the display device of the micro-blog terminal.

The embodiment of the current disclosure provides the user a list roster on which when the user chooses any one of the micro-blog list in the list roster, a new message displaying page is used for displaying the message list of the chosen micro-blog list. This solution for displaying micro-blog messages picks up the user following micro-blog list from the main message displaying page and displays in a different page, which organizes the messages of the users' main message page to be multiple pages in a tab illustrating mode, which facilitate the users in effective and quick check of the messages, and improves greatly the using efficiency of the micro-blog main page.

Figure 5:
FIG. 5 is a fourth illustrative diagram of the visual effect of the micro-blog message.

It is mentioned herein that, after the micro-blog list management module 101 displays the list roster for the user, the micro-blog list management module 101 further launches a timer to timely send an unread lookup request to the micro-blog server for looking up the unread messages of each micro-blog list included in the list roster. Meanwhile the micro-blog list management module 101 receives and iterates the ID lists with unread signs that are fed back from the micro-blog server, and displays in the user's list roster the corresponding unread sign. Referring to FIG. 5, an illustrative diagram of a fourth visual effect of the micro-blog message is provided. If the micro-blog list management module 101 finds an unread sign is set on the micro-blog list "Hong Kong and Taiwan Actor" after iterating the ID lists that are fed back from the micro-blog server, it is indicated that there are new messages being posted by the members of the micro-blog list "Hong Kong and Taiwan Actor" between the time of the last unread lookup request and the current unread lookup request. The micro-blog list management module may use a new font to re-draw the name of the "Hong Kong and Taiwan Actor" in the list roster, and display in the list roster using the new font (as in FIG. 5) for reminding the user to read the new message. It shall be understood that, the way that the micro-blog list management uses the new font for the display of the unread sign is only illustrative, other methods, such as adding a reminding frame next to the micro-blog list with unread sign in the list roster for reminding the user to read the new message shall be similarly provided and would not be described here. Besides, in the current embodiment, the time for the timer could be determined by applicable demands. The timer may either be implemented as a batch of instructions or as a hardware timer which generates corresponding signals for the follow-up processing.

The current embodiment timely looks up the micro-blog lists in the list roster for the existence of unread message, and reminds the user the unread messages. This could remind the user to check the new messages in the micro-blog list in time, which facilitates the examination of the micro-blog message and the application of the micro-blog.

For a clear description of the current disclosure, it is hereby described the micro-blog server of the current disclosure.

Figure 6:
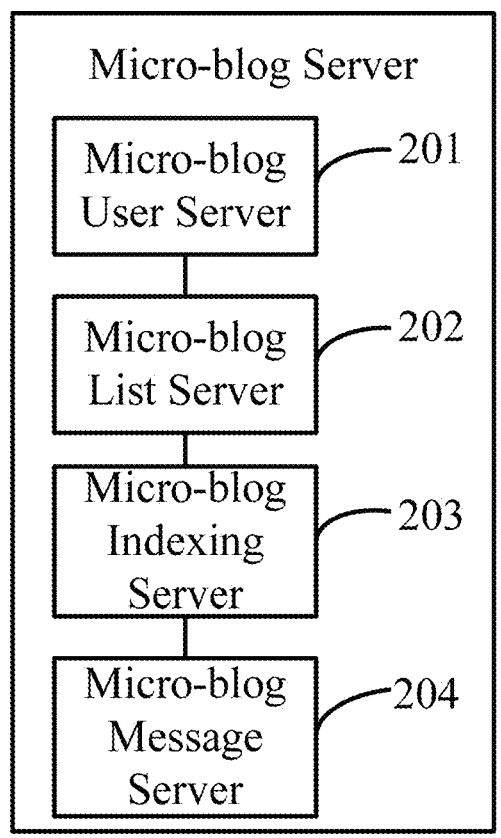
FIG. 6 is a structural diagram of a micro-blog server in accordance with an embodiment of the current disclosure.

Referring to FIG. 6, a structural diagram of a micro-blog server in accordance with an embodiment of the current disclosure includes as follows.

A micro-blog user server 201 is used for storing and managing the general information of the micro-blog users; and for looking up the micro-blog list IDs of the micro-blog lists that the user joins or creates from its own database according to the user ID included in the obtaining request from the micro-blog terminal, and generating a micro-blog list ID roster accordingly.

In practice, the general information of the micro-blog user includes but not limited to: the user ID, the micro-blog list IDs of the micro-blog lists that the user joins or creates, the user type, the user tag attribution, the authentication information, and any one or more of the user's follows. When received with the obtaining request from the micro-blog terminal for obtaining the user's list roster, the micro-blog user server 201 looks up the micro-blog list IDs of the micro-blog lists that the user joins or creates according to the user ID included in the obtaining request, and accordingly generate a micro-blog list ID roster.

The micro-blog user server 201 could in other embodiments be implemented as a micro-blog user module contained in the micro-blog server. It shall also be appreciated that, in some other embodiments, the micro-blog user server 201 or the micro-blog user module may include storage medium for storing the general information of micro-blog users, one or more processor for managing the general information, looking up the micro-blog list IDs of the micro-blog lists that the user joins or creates, and generating the micro-blog list ID roster.

A micro-blog list server 202 is used for storing and managing general information of the micro-blog lists; for obtaining the general information of the micro-blog lists corresponding to each micro-blog list ID according to the user's micro-blog list ID roster, and feeding back to the micro-blog terminal the user's micro-blog list ID roster and the general information of the micro-blog lists corresponding to each micro-blog list ID; and for looking up the member ID lists of the chosen micro-blog list according to the chosen micro-blog list ID included in a message list request that is sent from the micro-blog terminal.

The general information of the micro-blog list includes but not limited to: micro-blog list ID and its member ID list, name of the micro-blog list, brief introduction of the micro-blog list, type of the micro-blog list, and one or more of the attributes of the micro-blog list. The micro-blog list server 202 obtains from its own database the general information of the micro-blog list corresponding to the micro-blog list ID according to the micro-blog list ID roster that is generated by the micro-blog user server 201, and sends the user's micro-blog list ID roster and the general information of the micro-blog list corresponding to each micro-blog list ID to the micro-blog terminal. The micro-blog list management module 101 of the micro-blog terminal generate the user's list roster which includes at least one micro-blog list according to the user's micro-blog list ID roster and the general information of the micro-blog list corresponding to each micro-blog list ID that are fed back from the micro-blog list server 202, and displays the user's list roster in the displaying interface.

When receiving the message list request which is sent from the micro-blog list management module 101 of the micro-blog terminal, the micro-blog list server 202 looks up from its own database the member ID list according to the chosen micro-blog list ID included in the message list request.

The micro-blog list server 202 could in other embodiments be implemented as a micro-blog list module contained in the micro-blog server. It shall also be appreciated that, in some other embodiments, the micro-blog list server 202 or the micro-blog list module may include storage medium for storing the general information of micro-blog lists, one or more processor for managing the general information of the micro-blog lists, obtaining the general information of the micro-blog lists, feeding back to the micro-blog terminal, looking up the member ID lists of the chosen micro-blog list. In some examples, the storage medium could be shared with the micro-blog user server or the micro-blog user module.

A micro-blog indexing server 203 is used for managing the message indexing, and managing a mapping relationship between the message indexing ID and the user ID; and for obtaining the members' message indexing ID list of the chosen micro-blog list according to the member ID list of the chosen micro-blog list, iterating the members' message indexing ID list of the chosen micro-blog list, ranking all the message indexing ID in light of the timeline, generating the message indexing ID list of the chosen micro-blog list, and feeding back the message indexing ID list of the chosen micro-blog list to the micro-blog terminal.

In practice, the micro-blog indexing server 203 stores and manages the indexing of all the user posted messages, each indexing of the message being corresponding to an ID for identifying the indexing of the message. An indexing ID list is generated by ranking the message indexing ID in a time sequence. The micro-blog indexing server 203 is also used for storing and managing the mapping relationship between the message indexing ID and the user ID. The mapping relationship between the message indexing ID and the user ID is that, each message indexing ID is corresponding to a user ID, wherein such mapping relationship between the indexing ID and the user ID indicates that the message corresponding to the indexing ID is posted by the user corresponding to the user ID. The micro-blog indexing server 203 obtains from its own database the message indexing ID list of the members in the chosen micro-blog list according to the looked up member ID list of the chosen micro-blog list from the micro-blog list server 202. The micro-blog indexing server 203 iterates the message indexing ID list of the members of the chosen micro-blog list, ranks all the message indexing ID in light of the timeline, to generate a messaging indexing ID list of the chosen micro-blog list, and feeds back the messaging indexing ID list of the chosen micro-blog list to the micro-blog terminal, thereby enabling the micro-blog message management module 102 of the micro-blog terminal to pack the message indexing ID list of the chosen micro-blog list that is fed back from the micro-blog indexing server 203, to generate a message body obtaining request to be sent to the micro-blog server for obtaining the message body corresponding to the message indexing ID list of the chosen micro-blog list.

The micro-blog indexing server 203 could in other embodiments be implemented as a micro-blog indexing module contained in the micro-blog server. It shall also be appreciated that, in some other embodiments, the micro-blog indexing server 203 or the micro-blog indexing module may include one or more processor for managing the message indexing, managing the mapping relationship between message indexing ID and the user ID, obtaining the members' message indexing ID list of the chosen micro-blog list; iterating the members' message indexing ID list; ranking all the message indexing ID in light of the timeline, generating the message indexing ID list of the chosen micro-blog list, and feeding back the message indexing ID list of the chosen micro-blog list to the micro-blog terminal.

A micro-blog message server 204 is used for managing message bodies and the mapping relationship between the message indexing ID and the message body; providing the micro-blog terminal with message bodies corresponding to the message indexing ID list of the current message list; drawing the message bodies corresponding to the message indexing IDs in the messaging indexing ID list of the chosen micro-blog list according to the message indexing ID list of the chosen micro-blog list contained in the message body obtaining request sent from the micro-blog terminal; and feeding back the message bodies corresponding to the message indexing IDs in the message indexing ID list to the micro-blog terminal.

The micro-blog message server 204 stores and manages all the message bodies that all the users have posted, and manages the mapping relationship between the message indexing ID and the message bodies. The mapping relationship between the message indexing ID and the message bodies is that each message indexing ID is corresponding to one message body, wherein the mapping relationship between the message indexing ID and the message body indicates that the message corresponding to the message indexing ID includes the contents of the message body. A complete micro-blog message includes: the user ID (registered profile information such as registered name, UID) and message body (information like posted content, quoted content, location, tag of the message type, et al); wherein the user ID and the message body interconnects to each other through the message indexing ID. The micro-blog message server 204 draws the message bodies corresponding to the message indexing IDs in the messaging indexing ID list of the chosen micro-blog list according to the message indexing ID list of the chosen micro-blog list contained in the message body obtaining request sent from the micro-blog message management module 102 of the micro-blog terminal; and feeds back the message bodies corresponding to the message indexing IDs in the message indexing ID list to the micro-blog message management module 102 of the micro-blog terminal, thereby enabling the micro-blog message management module 102 to create the Item control for each message of the chosen micro-blog list, to generate a message list, and sequentially to display the message list of the chosen micro-blog list in the new message displaying page with the name of the chosen micro-blog list.

The micro-blog message server 204 could in other embodiments be implemented as a micro-blog message module contained in the micro-blog server. It shall also be appreciated that, in some other embodiments, the micro-blog message server 204 or the micro-blog message module may include one or more processor for managing message bodies and the mapping relationship, providing the message bodies, drawing the message bodies, and feeding back the message bodies.

The embodiment of the current disclosure provides the user a list roster on which when the user chooses any one of the micro-blog list in the list roster, a new message displaying page is used for displaying the message list of the chosen micro-blog list. This solution for displaying micro-blog messages picks up the user following micro-blog list from the main message displaying page and displays in a different page, which organizes the messages of the users' main message page to be multiple pages in a tab illustrating mode, which facilitate the users in effective and quick check of the messages, and improves greatly the using efficiency of the micro-blog main page.

It shall be mentioned that, when receiving the timely sent unread lookup request from the micro-blog list management module 101 of the micro-blog terminal, the micro-blog list server 202 determines whether the members of the micro-blog list corresponding to the micro-blog list ID have posted new messages between the last unread lookup request and the current unread lookup request, according to the micro-blog list ID roster contained in the unread lookup request. If there finds the new posted messages, an unread sign is set on the micro-blog list ID of which the user that posted the new message is the member, and a micro-blog list ID roster with unread signs are sent back to the micro-blog list management module 101 of the micro-blog terminal, thereby enabling the micro-blog list management module 101 of the micro-blog terminal to display the unread sign on the user's micro-blog list roster.

The current embodiment timely looks up the micro-blog lists in the list roster for the existence of unread message, and reminds the user the unread messages. This could remind the user to check the new messages in the micro-blog list in time, which facilitates the examination of the micro-blog message and the application of the micro-blog.

For clear description of the current disclosure, a detailed description of the method for displaying micro-blog messages is provided hereinafter.

Figure 7:
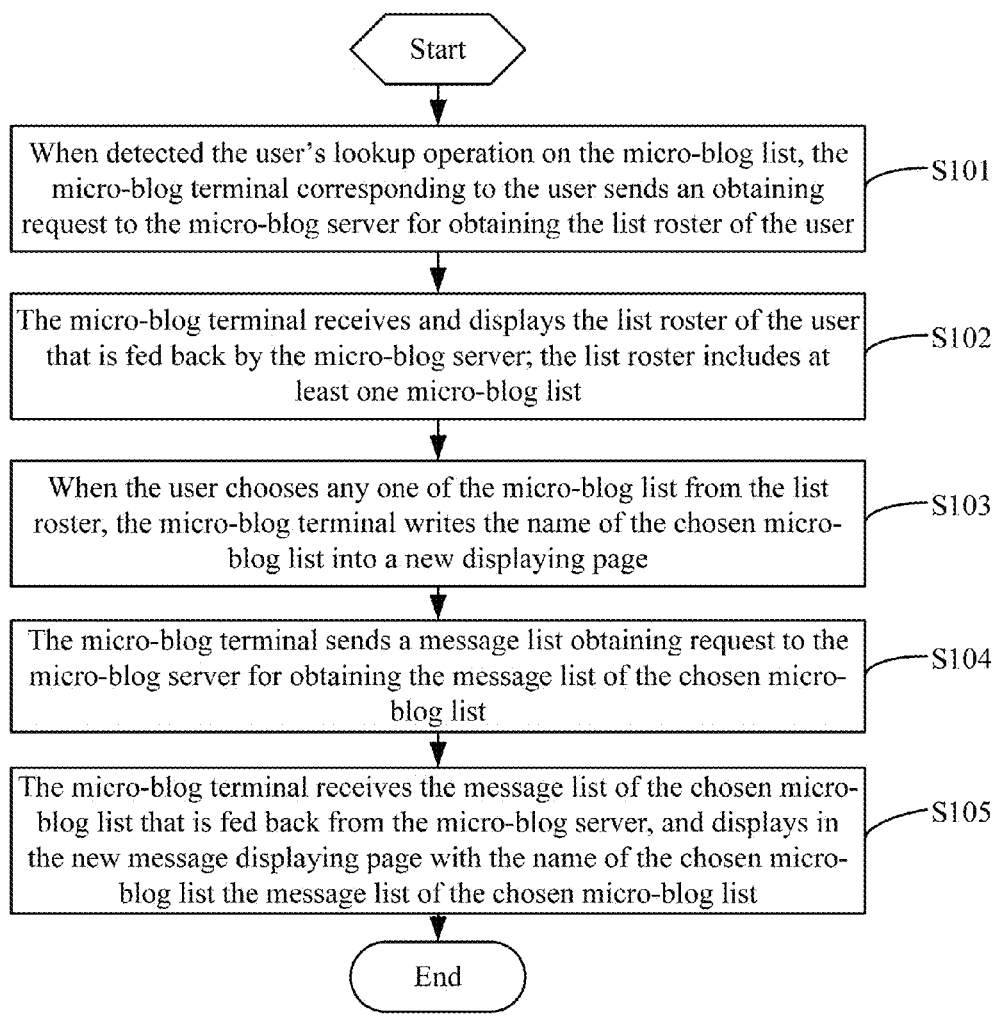
FIG. 7 is a flow diagram of the method for displaying micro-blog messages in accordance with a first embodiment.

Please refer to FIG. 7, which is a flow diagram of the method for displaying micro-blog messages in accordance with a first embodiment, which method includes as follows.

S101, when detected the user's lookup operation on the micro-blog list, the micro-blog terminal corresponding to the user sends an obtaining request to the micro-blog server for obtaining the list roster of the user.

The user is authenticated through using the registered user account and password to log in the micro-blog server through an IM client of the micro-blog terminal. After the successful authentication, a connection channel is set up between the micro-blog terminal and the micro-blog server, whereby the micro-blog terminal is coupled to the micro-blog server through a coupling server. The micro-blog terminal maintains the connection with the micro-blog server through sending a timing heartbeat to the micro-blog server. Each user has his own list roster according to the micro-blog list that he creates or joins. The micro-blog terminal provides the user a functional key named "My List". The functional key "My List" may be displayed in a foldable mode (as in FIG. 2) or a floating mode (as in FIG. 3), the user may click the displayed list roster in "My List" to create a new micro-blog list, as well as to manage (delete or edit) the micro-blog lists that are included in the list roster. The micro-blog terminal monitors the mouse operation of the user, when it is monitored that a user clicks the mouse for a lookup operation on the micro-blog list, the S101 sends an obtaining request to the micro-blog server for obtaining the list roster of the user. In detail, the S101 packages the user's ID, and accordingly generates the obtaining request to be sent to the micro-blog server, for obtaining the list roster of the user.

S102, the micro-blog terminal receives and displays the list roster of the user that is fed back by the micro-blog server; the list roster includes at least one micro-blog list.

After S101 sending the obtaining request, the S102 receives and displays the list roster of the user that is fed back by the micro-blog server. The list roster includes at least one micro-blog list. It shall be understandable that, the S102 displays the list roster through a foldable mode or a floating mode.

S103, when the user chooses any one of the micro-blog list from the list roster, the micro-blog terminal writes the name of the chosen micro-blog list into a new displaying page, and sends a message list request to the micro-blog server for obtaining the message list of the chosen micro-blog list.

When the user choose any one of the micro-blog list in the list roster, with reference to FIG. 4, as the user chooses the micro-blog list named "Hong Kong and Taiwan Actress" from the list roster, the S103 would write the name of the micro-blog list "Hong Kong and Taiwan Actress" into a new message displaying page (as in FIG. 4), which new message displaying page is located in a latter page of the main message displaying page. In practice, the S103 packages the IDs of the "Hong Kong and Taiwan Actress" in the micro-blog list, to generate the obtaining request to be sent to the micro-blog server, to request for obtaining the message lists of the "Hong Kong and Taiwan Actress" in the chosen micro-blog list.

S104, the micro-blog terminal receives the message list of the chosen micro-blog list that is fed back from the micro-blog server, and displays in the new message displaying page with the name of the chosen micro-blog list the message list of the chosen micro-blog list.

After the S103 sends a message list request, the S104 receives the message list of the chosen micro-blog list that is fed back from the micro-blog server, and displays in the new message displaying page with the name of the chosen micro-blog list the message list of the chosen micro-blog list. In detail, the S104 receives a message indexing ID list and message bodies corresponding to each message indexing ID in the message indexing ID list that are fed back from the micro-blog server, and creates an Item control for each message of the chosen micro-blog list, to generate a message list; and sequentially display the message list of the chosen micro-blog list in the new message displaying page with the name of the chosen micro-blog list (with reference to FIG. 4 for details). It shall be mentioned that, the current embodiment picks up the message lists that the user is following in the micro-blog list from the main message displaying page, and sequentially displays in different pages, which facilitate the users in effective and quick check of the messages, and improves greatly the using efficiency of the micro-blog main page.

The embodiment of the current disclosure provides the user a list roster on which when the user chooses any one of the micro-blog list in the list roster, a new message displaying page is used for displaying the message list of the chosen micro-blog list. This solution for displaying micro-blog messages picks up the user following micro-blog list from the main message displaying page and displays in a different page, which organizes the messages of the users' main message page to be multiple pages in a tab illustrating mode, which facilitate the users in effective and quick check of the messages, and improves greatly the using efficiency of the micro-blog main page.

Figure 8:
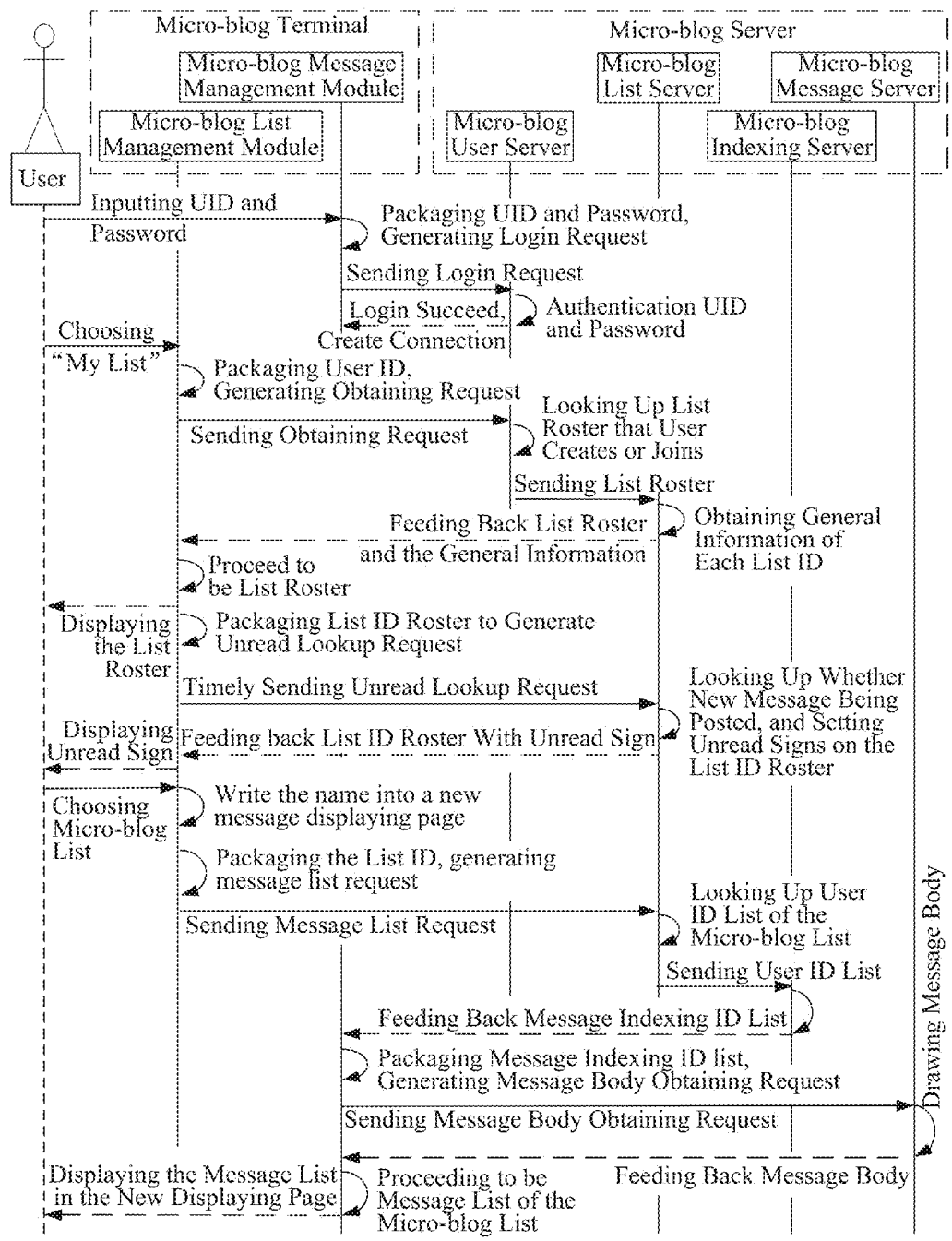
FIG. 8 is a flow diagram of the method for displaying micro-blog messages in accordance with a second embodiment.

Referring to FIG. 8, which is a flow diagram of the method for displaying micro-blog messages in accordance with a first embodiment. Which method includes as follows.

The user is authenticated through using the registered user account and password to log in the micro-blog server through an IM client of the micro-blog terminal. After the successful authentication, a connection channel is set up between the micro-blog terminal and the micro-blog server, whereby the micro-blog terminal is coupled to the micro-blog server through a coupling server. The micro-blog terminal maintains the connection with the micro-blog server through sending a timing heartbeat to the micro-blog server. The micro-blog terminal is used for displaying the message list of the micro-blog main page for the user.

When detected the user's lookup operation on the micro-blog list, the micro-blog list management module of the micro-blog terminal corresponding to the user packages the user's ID, and accordingly generates the obtaining request to be sent to the micro-blog server, for obtaining the list roster of the user. The micro-blog user server of the micro-blog server looks up the micro-blog list IDs of the micro-blog lists that the user joins or creates from its own database according to the user ID included in the obtaining request from the micro-blog terminal, and generating a micro-blog list ID roster accordingly, which micro-blog list ID roster includes at least one micro-blog list. The micro-blog list server of the micro-blog server obtains from its own database the general information of the micro-blog lists corresponding to each micro-blog list ID according to the user's micro-blog list ID roster, and feeds back to the micro-blog list management module the user's micro-blog list ID roster and the general information of the micro-blog lists corresponding to each micro-blog list ID.

The micro-blog list management module receives from the micro-blog list server the user's micro-blog list ID roster and the general information of the micro-blog lists corresponding to each micro-blog list ID, and generates the user's list roster which includes at least one micro-blog list according to the user's micro-blog list ID roster and the general information of the micro-blog list corresponding to each micro-blog list ID that are fed back from the micro-blog list server, and displays the user's list roster in the displaying interface.

The micro-blog list management module timely packages the micro-blog list ID roster of the user's micro-blog list roster, and generates an unread lookup request to be sent to the micro-blog server for looking up the unread messages of each micro-blog list included in the list roster. The micro-blog list server determines whether the members of the micro-blog list corresponding to the micro-blog list ID have posted new messages between the last unread lookup request and the current unread lookup request, according to the micro-blog list ID roster contained in the unread lookup request. If there finds the new posted messages, the micro-blog list server sets an unread sign on the micro-blog list ID of which the user that posted the new message is the member, and a micro-blog list ID roster with unread signs are sent back to the micro-blog list management module. The micro-blog list management module receives and iterates the ID lists with unread signs that are fed back from the micro-blog server, and displays in the user's list roster the corresponding unread sign.

When the user chooses any one of the micro-blog list from the list roster, the micro-blog terminal writes the name of the chosen micro-blog list into a new displaying page, and packages the chosen micro-blog list IDs to generate a message list request to be sent to the micro-blog server for requesting to obtain the message list of the chosen micro-blog list. The micro-blog list server looks up from its own database the member ID list according to the chosen micro-blog list ID included in the message list request. The micro-blog indexing server of the micro-blog server obtains from its own database the message indexing ID list of the members in the chosen micro-blog list according to the looked up member ID list of the chosen micro-blog list. The micro-blog indexing server iterates the message indexing ID list of the members of the chosen micro-blog list, ranks all the message indexing IDs in light of the timeline, to generate a messaging indexing ID list of the chosen micro-blog list, and feeds back the messaging indexing ID list of the chosen micro-blog list to the micro-blog message management module.

The micro-blog message management module packages the message indexing ID list of the chosen micro-blog list that is fed back from the micro-blog indexing server, to generate a message body obtaining request to be sent to the micro-blog server for obtaining the message body corresponding to the message indexing ID list of the chosen micro-blog list. The micro-blog message server of the micro-blog server draws the message bodies corresponding to the message indexing IDs in the messaging indexing ID list of the chosen micro-blog list according to the message indexing ID list of the chosen micro-blog list contained in the message body obtaining request sent from the micro-blog terminal; and feeds back the message bodies corresponding to the message indexing IDs in the message indexing ID list to the micro-blog terminal.

The micro-blog message management module receives the message indexing ID list and message bodies corresponding to each message indexing ID in the message indexing ID list that are fed back from the micro-blog message server, and generates a message list for the chosen micro-blog list. The micro-blog message management module sequentially displays the message list of the chosen micro-blog list in the new message displaying page with the name of the chosen micro-blog list.

The embodiment of the current disclosure provides the user a list roster on which when the user chooses any one of the micro-blog list in the list roster, a new message displaying page is used for displaying the message list of the chosen micro-blog list. This solution for displaying micro-blog messages picks up the user following micro-blog list from the main message displaying page and displays in a different page, which organizes the messages of the users' main message page to be multiple pages in a tab illustrating mode, which facilitate the users in effective and quick check of the messages, and improves greatly the using efficiency of the micro-blog main page. Meanwhile, the current embodiment timely looks up the micro-blog lists in the list roster for the existence of unread message, and reminds the user the unread messages. This could remind the user to check the new messages in the micro-blog list in time, which facilitates the examination of the micro-blog message and the application of the micro-blog.

Those skilled in the art could understand that the whole or part of the flows included in the method of the above embodiments could be accomplished by relative hardware under instruction of computer programs. The programs could be stored in computer readable storage medium. When executing the program, it would be included the flows as in the methods of the above embodiments. Wherein, the storage medium could be magnetic disks, optical disks, read-only memories, or random access memories, etc.

It is provided according to the current disclosure one or more storage medium that include executable program thereon. The executable program is used for carry out a method for displaying micro-blog messages. The method includes: when detected the user's lookup operation on the micro-blog list, the micro-blog terminal corresponding to the user sends an obtaining request to the micro-blog server for obtaining the list roster of the user; the micro-blog terminal receives and displays the list roster of the user that is fed back by the micro-blog server; the list roster includes at least one micro-blog list; when any one of the micro-blog list is selected by the user from the list roster, the micro-blog terminal writes the name of the chosen micro-blog list into a new displaying page, and sends a message list request to the micro-blog server for obtaining the message list of the chosen micro-blog list; the micro-blog terminal receives the message list of the chosen micro-blog list that is fed back from the micro-blog server, and displays in the new message displaying page with the name of the chosen micro-blog list the message list of the chosen micro-blog list.

In accordance with an exemplary embodiment, when detected the user's lookup operation on the micro-blog list, the micro-blog terminal corresponding to the user sends an obtaining request to the micro-blog server for obtaining the list roster of the user, which includes: when detected the user's lookup operation on the micro-blog list, the micro-blog terminal corresponding to the user packages the user's ID, and accordingly generates the obtaining request; the micro-blog terminal sends the obtaining request to the micro-blog server, for obtaining the list roster of the user.

In accordance with another exemplary embodiment, after the micro-blog terminal sends the obtaining request to the micro-blog server, and before the micro-blog terminal receives and displays the list roster of the user that is fed back by the micro-blog server, it is included that: the micro-blog server looks up the micro-blog list IDs of the micro-blog lists that the user joins or creates from a database according to the user ID included in the obtaining request from the micro-blog terminal, and generating a micro-blog list ID roster accordingly, which micro-blog list ID roster includes at least one micro-blog list; the micro-blog server obtains from a database the general information of the micro-blog lists corresponding to each micro-blog list ID according to the user's micro-blog list ID roster, and feeds back to the micro-blog terminal the user's micro-blog list ID roster and the general information of the micro-blog lists corresponding to each micro-blog list ID; wherein the general information of the micro-blog list includes but not limited to: micro-blog list ID and its member ID list, name of the micro-blog list, brief introduction of the micro-blog list, type of the micro-blog list, and one or more of the attributes of the micro-blog list.

According to one of the embodiments, the micro-blog terminal receives and displays the list roster of the user that is fed back by the micro-blog server, which includes: the micro-blog terminal receives from the micro-blog server the user's micro-blog list ID roster and the general information of the micro-blog lists corresponding to each micro-blog list ID, and generates the user's list roster which includes at least one micro-blog list according to the user's micro-blog list ID roster and the general information of the micro-blog list corresponding to each micro-blog list ID that are fed back from the micro-blog list server, and displays the user's list roster in the displaying interface.

According to one of the embodiments, the micro-blog terminal sends a message list request to the micro-blog server for obtaining the message list of the chosen micro-blog list; which includes: the micro-blog terminal packages the chosen micro-blog list IDs to generate a message list request to be sent to the micro-blog server for requesting to obtain the message list of the chosen micro-blog list.

According to an exemplary embodiment, after the micro-blog terminal sends a message list request to the micro-blog server, and before the micro-blog terminal receives the message list of the chosen micro-blog list that is fed back from the micro-blog server, it is includes that: the micro-blog server looks up from a database the member ID list according to the chosen micro-blog list ID included in the message list request; the micro-blog server obtains the message indexing ID list of the members in the chosen micro-blog list according to the looked up member ID list of the chosen micro-blog list; the micro-blog server iterates the message indexing ID list of the members of the chosen micro-blog list, ranks all the message indexing IDs in light of the timeline, to generate a messaging indexing ID list of the chosen micro-blog list, and feeds back the messaging indexing ID list of the chosen micro-blog list to the micro-blog terminal; the micro-blog terminal packages the message indexing ID list of the chosen micro-blog list that is fed back from the micro-blog server, to generate a message body obtaining request to be sent to the micro-blog server for obtaining the message body corresponding to the message indexing ID list of the chosen micro-blog list; the micro-blog server draws the message bodies corresponding to the message indexing IDs in the messaging indexing ID list of the chosen micro-blog list according to the message indexing ID list of the chosen micro-blog list contained in the message body obtaining request sent from the micro-blog terminal; and feeds back the message bodies corresponding to the message indexing IDs in the message indexing ID list to the micro-blog terminal.

According to one of the embodiments, the micro-blog terminal receives the message list of the chosen micro-blog list that is fed back from the micro-blog server, and displays in the new message displaying page with the name of the chosen micro-blog list the message list of the chosen micro-blog list, which includes: the micro-blog terminal receives the message indexing ID list and message bodies corresponding to each message indexing ID in the message indexing ID list that are fed back from the micro-blog server, and generates a message list for the chosen micro-blog list according to the message indexing ID list and message bodies corresponding to each message indexing ID in the message indexing ID list; the micro-blog terminal displays the message list of the chosen micro-blog list in the new message displaying page with the name of the chosen micro-blog list.

In accordance with an exemplary embodiment, after the micro-blog terminal receives and displays the list roster of the user that is fed back by the micro-blog server, it is included that: the micro-blog terminal timely sends an unread lookup request to the micro-blog server, for looking up the unread messages of each micro-blog list included in the list roster; which includes: the micro-blog terminal packages the micro-blog list ID roster of the user's micro-blog list roster, and generates an unread lookup request; the micro-blog terminal sends the unread lookup request to the micro-blog server for looking up the unread messages of each micro-blog list included in the list roster.

According to an embodiment, after the micro-blog terminal sends the unread lookup request to the micro-blog server, it is included that: the micro-blog server determines whether the members of the micro-blog list corresponding to the micro-blog list ID have posted new messages between the last unread lookup request and the current unread lookup request, according to the micro-blog list ID roster contained in the unread lookup request; if there finds the new posted messages, the micro-blog server sets an unread sign on the micro-blog list ID of which the user that posted the new message is the member, and a micro-blog list ID roster with unread signs are sent back to the micro-blog terminal, the micro-blog terminal receives and iterates the ID lists with unread signs that are fed back from the micro-blog server, and displays in the user's list roster the corresponding unread sign.

Figure 9:
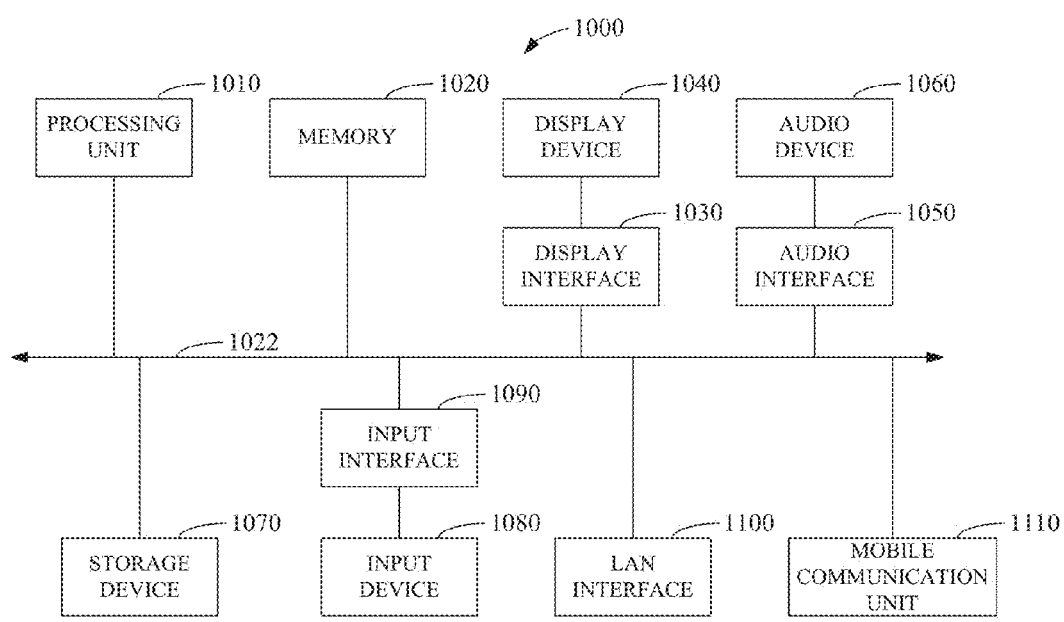
FIG. 9 shows a system block diagram of a computing system on which embodiments of the invention may be implemented.

FIG. 9 shows a system block diagram of a computing system 1000 on which embodiments of the invention may be implemented. The computing system 1000 is only one example of a suitable computing environment and is not intended to suggest any limitation as to the scope of use of the invention. Neither should the computing system 1000 be interpreted as having any dependency or requirement relating to any one or combination of components illustrated in the exemplary computing system 1000.

The computing system 1000 shown in FIG. 9 is an example of a computer system, either a terminal or a server, suitable for use with the invention. Other architectures having different configurations of subsystems can also be utilized. Examples of well-known computer systems may be suitable for use with embodiments of the invention include, but are not limited to, desktop computers, laptop computers, personal digital assistants, smart phones, tablet computers, portable media players, set top boxes, and the like.

As in FIG. 9, the computing system 1000 includes a processing unit 1010, a memory 1020, and a system bus 1022 that couples various system components including the memory 1020 to the processing unit 1010. The processing unit 1010 is a hardware that carries out the instructions of a computer program by performing the basic arithmetical and logical operations of the computer system. The memory 1020 is a physical device used to store computer program or data (e.g. program state information) on a temporary or permanent basis. The system bus 1022 may be any of several types of bus structures including a memory bus or memory controller, a peripheral bus, and a local bus. The system bus 1022 allows data communication between the processing unit 1010 and the memory 1020, which may include read-only memory (ROM) or flash memory (neither shown), and random access memory (RAM) (not shown). The RAM is generally the main memory into which the operating system and application programs are loaded.

The computing system 1000 further includes a display interface 1030 (e.g., graphic processing unit), a display device 1040 (e.g., liquid crystal display device), an audio interface 1050 (e.g., sound card), and an audio device 1060 (e.g., speaker). The display device 1040 and the audio device 1060 are media devices used to experience multimedia content.

The computing system 1000 typically includes a storage device 1070. The storage device 1070 may be selected from a variety of computer readable media. The computer readable media can be any available media that can be accessed by the computing system 1000 and includes both removable and non-removable media. By way of example, computer readable media includes, but is not limited to, flash memory (e.g., micro SD card), CD-ROM, digital versatile disks (DVD) or other optical disk storage, magnetic cassettes, magnetic tape, magnetic disk storage or other magnetic storage devices, or any other medium which can be used to store the desired information and which can accessed by the computing system 1000.

The computing system 1000 further includes an input device 1080 and an input interface 1090 (e.g., IO controller). A user may enter commands and information into the computing system 1000 through the input device 1080 such as a keyboard, a mouse, a touch panel disposed on the display device 1040. The input device 1080 is often connected to the processing unit 1010 through the input interface 1090 that is coupled to the system bus 1022, but may be connected by other interface and bus structures, such as a universal serial bus (USB).

The computing system 1000 may operate in a networked environment using logical connections to one or more network devices. The network device may be a personal computer, a server, a router, a smart phone, a tablet computer or other common network node. The computing system 1000 connects the network device via a local area network (LAN) interface 1100 or a mobile communication unit 1110. A local area network (LAN) is a computer network that interconnects computers in a limited area such as a home, school, computer laboratory, or office building using network media. Ethernet over twisted pair cabling, and Wi-Fi are the two most common technologies currently used to build LANs. Wi-Fi is a technology that allows the computing system 1000 to exchange data or connect to the internet wirelessly using radio waves. The mobile communication unit 1110 can make and receive telephone calls over a radio link while moving around a wide geographic area. In addition to telephony, the mobile communication unit 1110 also supports internet access by providing mobile data service on the 2G, 3G, or 4G cellular communication system.

It should be noted that, in other computing systems suitable for use with the invention, the computing system may include additional or fewer subsystems. For example, another computing system could include a Bluetooth unit for exchanging data over short distances, an image sensor for photography, and an accelerometer for measuring acceleration.

As described in detail above, the computing system 1000, consistent with the present invention, perform certain operations for the above process for displaying micro-blog message. The computing system 1000 may perform these operations in response to the processing unit 1010 executing software instructions contained in the computer readable media. The software instructions may be read into the memory 1020 from the storage device 1070, or from another device via the LAN interface 1100. The software instructions contained in the memory 1020 causes the processing unit 1010 to perform the process for displaying micro-blog message as described above. Alternatively, hardwired circuitry may be used in place of or in combination with software instructions to implement processes consistent with the present invention. Thus, the present invention is not limited to any specific combination of hardware circuitry and software.

The above described embodiments explains only several exemplary embodiments of the present disclosure while shall not be understood as to limit the invention to the precise forms disclosed. It shall be mentioned that for those skilled in the art, alternative embodiments could be made to which the present disclosure pertains without departing from its spirit and scope. Accordingly, the scope of the present disclosure is defined by the appended claims rather than the foregoing description and the exemplary embodiments described therein.

What is claimed is:

1. A micro-blog terminal, wherein the micro-blog terminal comprises:
   a micro-blog list management module comprising one or more processors configured to send a list roster obtaining request to a micro-blog server when a query operation is detected indicating a user is querying for a micro-blog list roster, thereby request for obtaining the user's micro-blog list roster; to receive and display the user's micro-blog list roster in a display as the micro-blog server feeds back, the micro-blog list roster comprises at least one micro-blog list; to write a name of the chosen micro-blog list into a new displaying page when any one of the at least one micro-blog list is selected from the micro-blog list roster; and to send a message list request to the micro-blog server for obtaining a message list of the chosen micro-blog list; and
   a micro-blog message management module comprising one or more processors configured to receive the message list of the chosen micro-blog list that is fed back from the micro-blog server, and to display the message list of the chosen micro-blog list on the new message displaying page with a name of the chosen micro-blog list in the display;
   wherein the micro-blog list management module is further configured to timely send an unread lookup request to the micro-blog server for looking up the unread messages of each micro-blog list comprised in the list roster; to receive and iterate the ID lists with unread signs that are fed back from the micro-blog server; and to display in the user's list roster the corresponding unread sign.

2. A micro-blog server, wherein the micro-blog server comprises a database, the micro-blog server further comprises:
   a micro-blog user module coupled to the database, the micro-blog user module is configured to store and manage general information of micro-blog users, the general information of each user comprises user ID, micro-blog list IDs of micro-blog lists that the user joins or creates; to look up the micro-blog list IDs of the micro-blog lists that the user joins or creates according to the user ID comprised in an obtaining request from a micro-blog terminal; and to generate a micro-blog list ID roster accordingly;
   a micro-blog list module coupled to the database, the micro-blog list module is configured to store and manage general information of the micro-blog lists, the general information of each micro-blog list comprises micro-blog list ID and its member ID list; and to obtain the general information of the micro-blog lists corresponding to each micro-blog list ID according to the user's micro-blog list ID roster, to feed back to the micro-blog terminal the user's micro-blog list ID roster and the general information of the micro-blog lists corresponding to each micro-blog list ID; and to look up the member ID lists of the chosen micro-blog list according to the chosen micro-blog list ID comprised in a message list request that is sent from the micro-blog terminal;
   a micro-blog indexing module coupled to the database, the micro-blog indexing module is configured to manage message indexing, and to manage a mapping relationship between message indexing ID and the user ID; and to obtain the members' message indexing ID list of the chosen micro-blog list according to the member ID list of the chosen micro-blog list; to iterate the members' message indexing ID list of the chosen micro-blog list; to rank all the message indexing ID in light of the timeline; to generate the message indexing ID list of the chosen micro-blog list; and to feed back the message indexing ID list of the chosen micro-blog list to the micro-blog terminal; and
   a micro-blog message module coupled to the database, the micro-blog message module is configured to manage message bodies and a mapping relationship between the message indexing ID and the message body; to provide the micro-blog terminal with message bodies corresponding to the message indexing ID list of the current message list; to draw the message bodies corresponding to the message indexing IDs in the messaging indexing ID list of the chosen micro-blog list according to the message indexing ID list of the chosen micro-blog list contained in the message body obtaining request sent from the micro-blog terminal; and to feed back the message bodies corresponding to the message indexing IDs in the message indexing ID list to the micro-blog terminal.

3. The micro-blog server according to claim 2, wherein the micro-blog list module is further configured to determine whether the members of the micro-blog list corresponding to the micro-blog list ID have posted new messages between a last unread lookup request and a current unread lookup request, according to the micro-blog list ID roster contained in the unread lookup request sent from the micro-blog terminal; to set an unread sign on the micro-blog list ID of which the user that posted the new message is the member if there finds the new posted messages; and to send back a micro-blog list ID roster with unread signs to the micro-blog terminal.

4. A system for displaying micro-blog messages in a display, wherein the system comprises a micro-blog terminal according to claim 1, and a micro-blog server having a database, the micro-blog server comprises:
   a micro-blog user server coupled to the database, the micro-blog user server is configured to store and manage general information of micro-blog users, the general information of each user comprises user ID, micro-blog list IDs of micro-blog lists that the user joins or creates; to look up the micro-blog list IDs of the micro-blog lists that the user joins or creates according to the user ID comprised in an obtaining request from the micro-blog terminal; and to generate a micro-blog list ID roster accordingly;
   a micro-blog list server coupled to the database, the micro-blog list server is configured to store and manage general information of the micro-blog lists, the general information of each micro-blog list comprises micro-blog list ID and its member ID list; and to obtain the general information of the micro-blog lists corresponding to each micro-blog list ID according to the user's micro-blog list ID roster, to feed back to the micro-blog terminal the user's micro-blog list ID roster and the general information of the micro-blog lists corresponding to each micro-blog list ID; and to look up the member ID lists of the chosen micro-blog list according to the chosen micro-blog list ID comprised in a message list request that is sent from the micro-blog terminal;
   a micro-blog indexing server coupled to the database, the micro-blog indexing server is configured to manage message indexing, and to manage a mapping relationship between message indexing ID and the user ID; and to obtain the members' message indexing ID list of the chosen micro-blog list according to the member ID list of the chosen micro-blog list; to iterate the members' message indexing ID list of the chosen micro-blog list; to rank all the message indexing ID in light of the timeline; to generate the message indexing ID list of the chosen micro-blog list; and to feed back the message indexing ID list of the chosen micro-blog list to the micro-blog terminal; and a micro-blog message server coupled to the database, the micro-blog message server is configured to manage message bodies and a mapping relationship between the message indexing ID and the message body; to provide the micro-blog terminal with message bodies corresponding to the message indexing ID list of the current message list; to draw the message bodies corresponding to the message indexing IDs in the messaging indexing ID list of the chosen micro-blog list according to the message indexing ID list of the chosen micro-blog list contained in the message body obtaining request sent from the micro-blog terminal; and to feed back the message bodies corresponding to the message indexing IDs in the message indexing ID list to the micro-blog terminal.

* * * * *